J. J. CURRY.
AUTOMATIC CONTROL FOR AUTOMOBILES.
APPLICATION FILED OCT. 31, 1914.
1,156,760.
Patented Oct. 12, 1915.
4 SHEETS—SHEET 4.
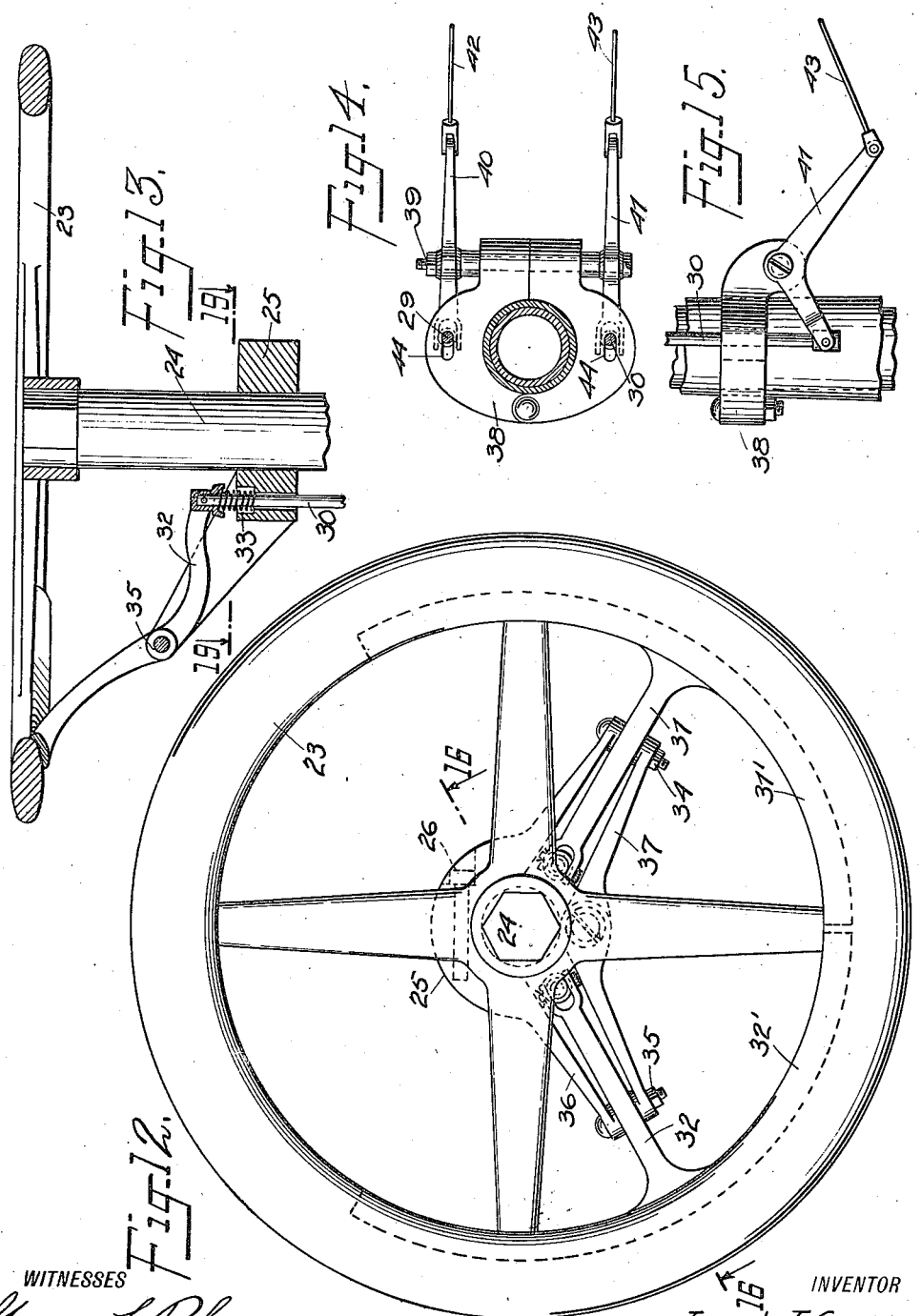
WITNESSES
George L. Blume.
A. L. Kitchin.
INVENTOR
Joseph J. Curry
BY Munn & Co.
ATTORNEYS

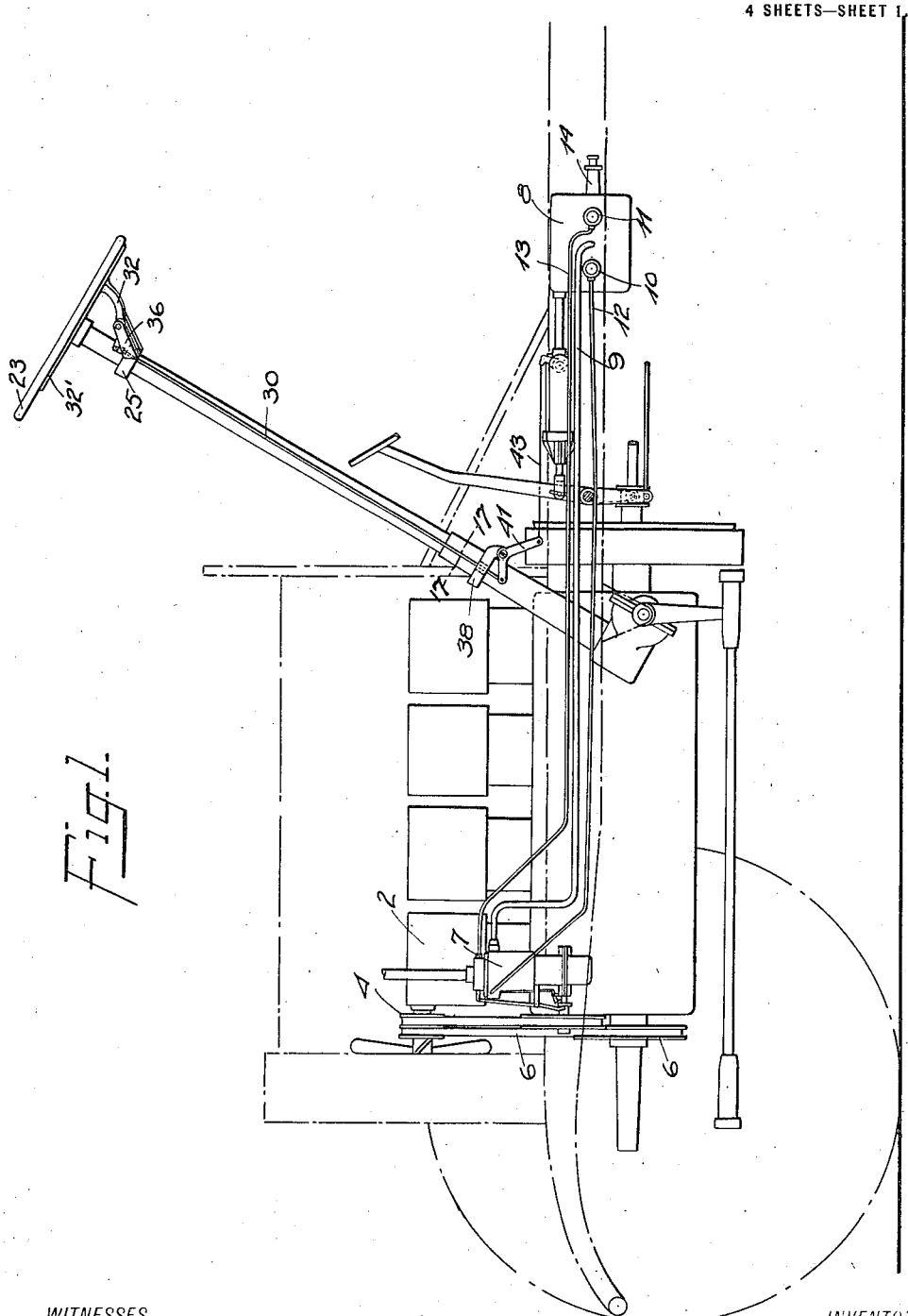

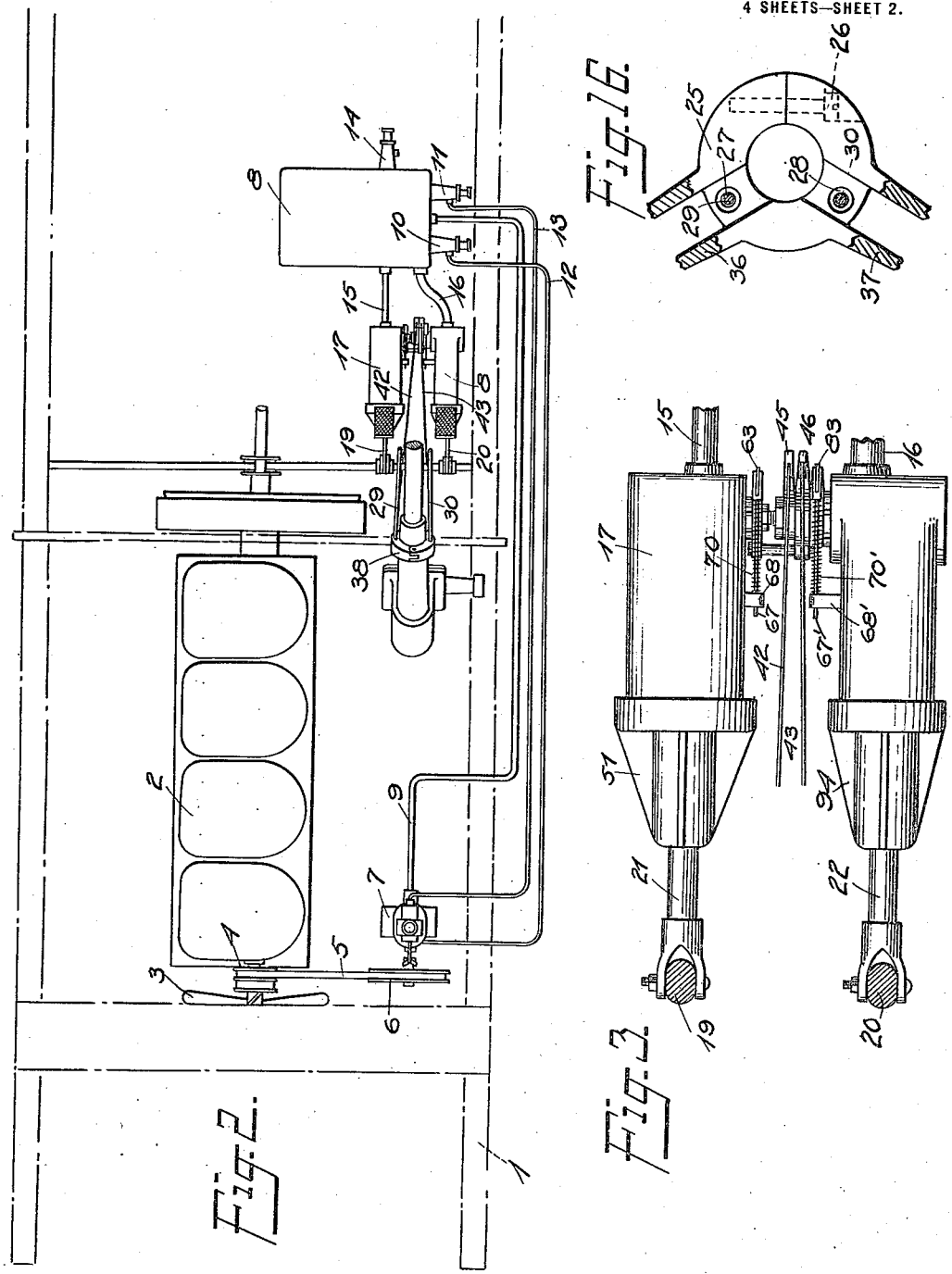

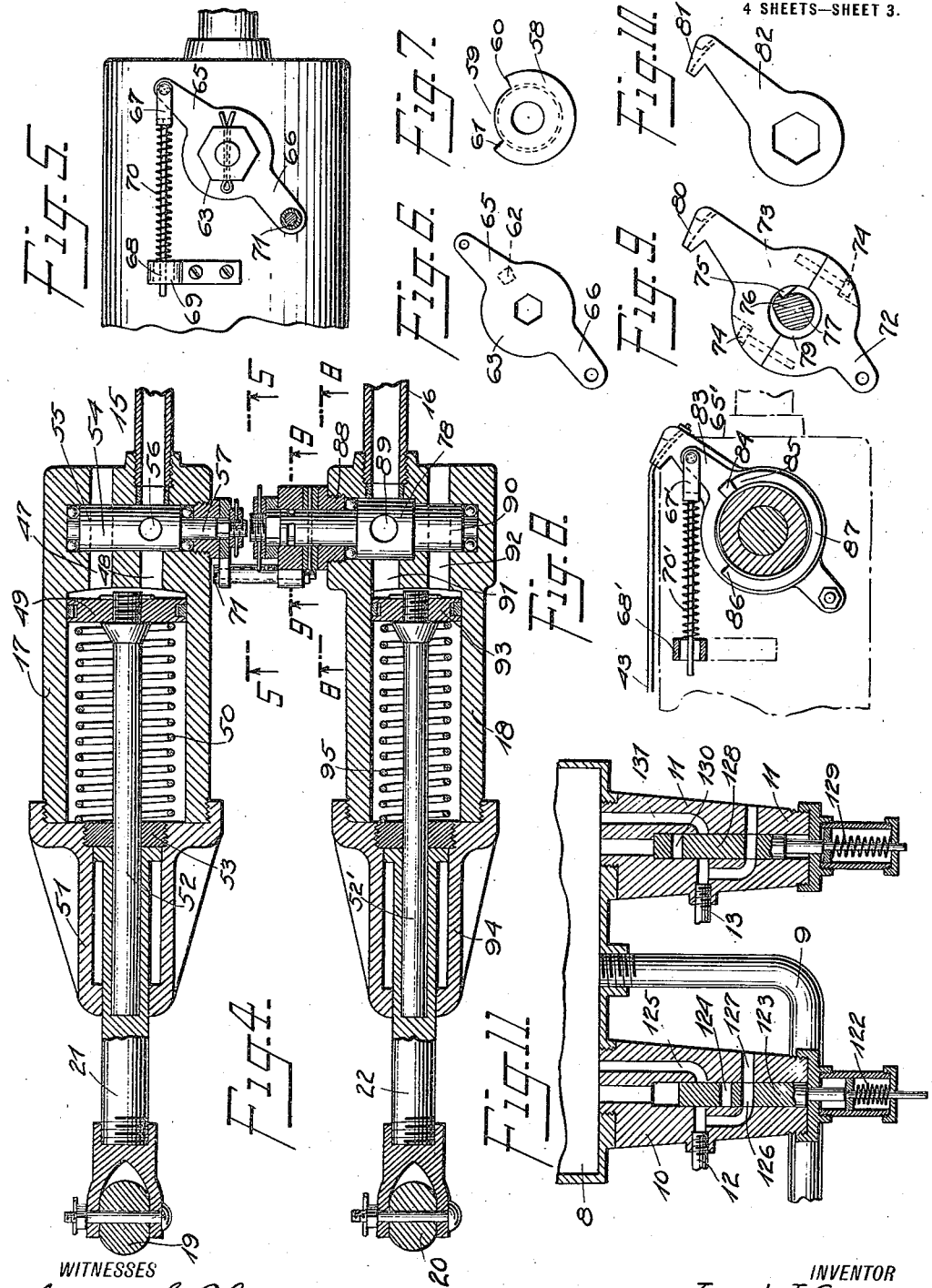

UNITED STATES PATENT OFFICE.

JOSEPH J. CURRY, OF NEW YORK, N. Y.

AUTOMATIC CONTROL FOR AUTOMOBILES.

1,156,760.  Specification of Letters Patent.  Patented Oct. 12, 1915.

Application filed October 31, 1914. Serial No. 869,589.

*To all whom it may concern:*

Be it known that I, JOSEPH J. CURRY, a citizen of the United States, and a resident of the city of New York, borough of Manhattan, county and State of New York, have invented a new and Improved Automatic Control for Automobiles, of which the following is a full, clear, and exact description.

This invention relates to improvements in automatic controlling devices for automobiles, and has for an object to provide an improved construction which will throw out the clutch and apply the brakes whenever the operator removes his hands from the steering wheel.

Another object of the invention is to provide an improved construction which may be operated at any time by the feet or may be operated at any time by the hand so as to throw out the clutch and apply the brake at any time.

A further object of the invention is to provide an improved air brake system controlled either by the ordinary foot pedal, or by specially arranged hand operated members connected with the steering wheel.

In the accompanying drawings:—Figure 1 is a diagram of a front of an automobile with an embodiment of the invention applied thereto; Fig. 2 is a top plan view of the structure shown in Fig. 1; Fig. 3 is a top plan view on an enlarged scale of the air brake cylinders; Fig. 4 is a longitudinal horizontal section through the cylinder shown in Fig. 3, the same being on a slightly enlarged scale to that shown in Fig. 3; Fig. 5 is a detailed fragmentary sectional view through Fig. 4 approximately on line 5—5, the same being on a somewhat enlarged scale; Fig. 6 is a side view of one of the levers used for controlling the cylinder shown in Fig. 4; Fig. 7 is a bearing nut forming certain features of the invention; Fig. 8 is a section through Fig. 4 approximately on line 8—8, the same being on a slightly enlarged scale; Fig. 9 is a detailed fragmentary view approximately on line 9—9 of Fig. 1, the same being on an enlarged scale; Fig. 10 is an enlarged detailed view of one of the arms disclosed in Fig. 4; Fig. 11 is an enlarged detailed fragmentary sectional view through a pair of cut-out valves associated with the air supply tank shown in Fig. 2; Fig. 12 is a top plan view of the steering wheel and associated parts; Fig. 13 is a section through Fig. 12 approximately on line 16—16; Fig. 14 is a detailed fragmentary sectional view through Fig. 1 approximately on line 17—17, the same being shown on an enlarged scale; Fig. 15 is a side view of the structure shown in Fig. 14; Fig. 16 is a section through Fig. 13 on line 19—19.

Referring to the accompanying drawings by numerals, 1 indicates an automobile of any desired construction which is provided with an engine 2 of any desired structure which operates a fan 3 in the usual way. To the shaft on which fan 3 is mounted is secured an extra pulley 4 which carries belt 5. Belt 5 in addition to passing over pulley 4 passes over a pulley 6 which last mentioned pulley may be connected or disconnected by a suitable brake with a pump 7. Pump 7 supplies air to a reservoir 8 through pipe 9. Connected with reservoir 8 are automatically actuated relief valves 10 and 11 to which are connected pipes 12 and 13.

Connected with tank 8 in addition to the valves 10 and 11 is a relief valve 14 which is designed to blow off in the usual manner when a predetermined air pressure has been provided in tank 8 and the relief valves 10 and 11 have failed to work. The tank 8 is connected by pipes 15 and 16 to cylinders 17 and 18, which cylinders are connected with the foot treadles 19 and 20, which foot treadles are connected by any suitable mechanism to the usual clutch for connecting the engine with the driving wheels and the braking mechanism of the automobile. The foot treadles 19 and 20 may be operated by the feet in the usual manner at any time, or may be operated by the piston rods 21 and 22 (Fig. 3) whenever air under pressure is let into the respective cylinders.

In order to automatically operate the clutch and brake, air is automatically let into the cylinders 17 and 18 through the action of certain parts shown in detail in Figs. 12 to 15, inclusive. The automobile 1 is provided with a steering wheel 23 of any usual or preferred structure which has a steering column or post 24. Connected with the steering column or post 24 is an encircling member 25 clamped in position in any desired manner, as for instance by a screw 26. The encircling member 25 is provided with a pair of openings 27 and 28 for accommodating the rods 29 and 30. These rods are pivotally connected to arms 31 and 32 as more clearly shown in Figs. 15 and 16. A spring 33 surrounds each of the rods 29 and 30 and is interposed between the surrounding member 25 and the respective arms 31 and 32, whereby the rods 31 and 32 are raised whenever the outer ends of arms 31 and 32 are released. When the automobile is moving along the road under power freely, the hands of the operator hold the arms 31 and 32 in the position shown in Fig. 13 so that the outer ends will rest against the wheel 23. These arms are pivotally mounted at 34 and 35, respectively, to brackets 36 and 37 extending from the stop or encircling member 25. By this construction and arrangement whenever the hands of the operator are moved from both of the arms the same automatically move so that the rods 29 and 30 will move upwardly. From Fig. 12 it will be noted that the arms 31 and 32 are provided with arc shaped ends 31' and 32' so that the same may be readily grasped at almost any point around the wheel 23. The rods 29 and 30 extend downwardly from near the wheel 23 to near the lower end of the steering post 24, as shown in Fig. 1, and pass through a supporting bracket 38 as shown more clearly in Figs. 14 and 15. The bracket 38 is clamped in position by any suitable means, as for instance bolt 39, which bolt also acts as a pivotal support for the bell crank levers 40 and 41, which bell crank levers are connected at one end with the rods 29 and 30, and at the other end with wires or cables 42 and 43, respectively. It will be noted that the bracket 38 is provided with apertures or slots 44 and 45 for allowing a limited free movement of the rods 29 and 30. The wires 42 and 43 are connected with levers 45 and 46 (Fig. 3) which levers are designed to operate the valve mechanism more clearly shown in Fig. 4 for turning on and off the air to the cylinders 17 and 18, respectively. The construction is such that when cable 42 is pulled the clutch will be disconnected so that the automobile will coast, and when the cable 43 is pulled the clutch is disconnected and the brakes are applied whereby the automobile will be stopped.

Referring more particularly to Figs. 3 and 4, it will be observed that the cylinder 17 is provided with a pair of ports 47 and 48, and has arranged in the cylinder a suitable piston 49 normally held as shown in Fig. 4 by a spring 50. A piston rod 21 extends through the head 51 which acts as a guide therefor. This piston rod is formed with a hollow portion into which the power rod 52 loosely fits, power rod 52 being rigidly connected with piston 49, whereby when air is admitted into the cylinder 17 piston 49 will be moved toward the guide 53, and will move piston 49 so that the clutch connected therewith will be moved out of mesh. By arranging the power rod 52 loosely fitting in the piston rod 21, the same may be moved independently of rod 52 by the treadle 19 so as to manually disconnect the clutch. A rotating valve member 54 is arranged to control the air passing through the ports 47 and 48, the valve member 54 being formed with apertures 55 and 56 arranged preferably at right angles to each other so that port 48 will be open whenever port 47 is closed, or port 47 will be open while port 48 is closed. The valve member 54 is provided with a shaft 57 extending through a bearing nut 58 (Fig. 7), which bearing nut is provided with a notched-out portion 59, whereby there are presented stops 60 and 61. These stops are designed to engage a lug 62 arranged on the lever 63. Lever 63 is preferably provided with a polygonal opening in the center for fitting over a small polygonal part of shaft 57, whereby whenever lever 63 is moved the shaft together with valve 54 will be moved. A suitable nut is provided for continually holding member 63 in place. The member or lever 63 is provided with extensions 65 and 66, extension 65 having a rod 67 pivotally connected therewith, which rod extends through a guiding member 68, said guiding member being formed with a slot 69 for accommodating rod 67. A spring 70 surrounds rod 67 and bears at one end against guide member 68 and at the other the enlarged end which is pivotally connected with extension 65 of lever 63. By providing a spring arranged in this manner lever 63 and associated parts will engage valve 64 which normally remains in the position shown in Figs. 4 and 5, and will move again to that position as soon as released after having been moved therefrom. The extension 66 has rigidly connected therewith a cross bar 71 which also projects into the extension 72 formed on the lever 73. A suitable nut may be provided for holding this bar or bolt in place as shown in Fig. 4. The lever 73 is preferably made in two parts and secured together by suitable bolts 74 (Fig. 9) so that the same may be easily applied and removed whenever desired. The lever 73 is provided with a lug or projection 75 designed to engage the lug or projection 76 formed on shaft 77 for rotating shaft 77 and the valve 78 formed integral therewith. A groove 79 is provided in shaft 77 so that shaft 77 may be rotated independently of lever 73 within certain limitations. The upper end of lever 73 is provided with a grooved extension 80 in which the end of wire 43 is secured, while the end of wire 42 is secured in a small grooved extension 81 of lever 82. Lever 82 (Fig. 10) is provided with a square opening which is fitted over a square part of the shaft 77, whereby whenever lever 82 is moved shaft 77 will be moved. Associated with levers 73 and 82 is a lever 83, which lever is similar to lever 63 except that it has only one projection 65' which is connected with a rod 67' or co-acts with a spring 70' and with a stop 68' in a similar manner to the structure shown in Fig. 5. The lever 83 is provided with a lug 84 adapted to strike against the abutments 85 and 86 formed by cutting away a section of the head 87 of the bearing member 88. This limits the rotative movement of the valve member 78 so that apertures 89 and 90 may register with their respective ports 91 and 92 according to the position of the valve member. When aperture 89 is registering with port 91, air under pressure is let into the cylinder 18, while port 92 allows air to escape when aperture 90 is in registry therewith. When air is admitted into cylinder 18 the same moves piston 93 toward the bearing end 94 against the action of spring 95. It will be observed that piston rod 22 is constructed similar to piston rod 21, and is arranged with a shaft or rod 52' in a similar manner so that the clutch will be disconnected and the brakes may be applied without admitting pressure to the cylinder 18, the same being accomplished by having the operator move treadle 20 by its foot.

From the construction described, it will be noted that as long as the hands of the operator hold the members 31' and 32' (Figs. 12 and 13) in the position shown in Fig. 13, the air from tank 8 will not be admitted into either of the cylinders 17 and 18 as the valves and associated parts are in the position shown in Fig. 4. If the operator releases member 31' the spring 33 associated therewith, as shown in Fig. 13, will raise rod 29, and will act through bell crank lever 40 so as to pull the cable 42. When cable 42 is pulled the same rotates lever 81, which lever will in turn rotate valve 78 without molesting valve 54, thus admitting air under pressure into cylinder 18 and thereby disconnecting the clutch. When member 31' is restored to the position shown in Fig. 13 valve 78 will resume the position shown in Fig. 4, the same moving under the action of spring 70' (Fig. 8). This will close port 92 and allow the air to escape so that the clutch is again thrown into operation. If the member 32' was released rod 30 would be moved longitudinally and bell crank lever 41 moved pivotally. Upon a pivotal movement of this kind by bell crank lever 41, cable 43 will be moved, and as cable 43 is secured to lever 73, said lever 73 will be rotated partially, and will turn valve 78 sufficiently for opening port 91, and will also move bar 71 so that valve 54 will also be rotated until port 48 has been opened so that air under pressure will enter both of the cylinders 17 and 18 and consequently will apply the brakes, and will disconnect the clutch. In view of this construction if an operator should release both of the members 31 and 32 the car would automatically stop.

What I claim is—

1. In an automatic control for automobiles, a controlling pedal connected with the clutch for operating the same, a controlling pedal connected with the brake for operating the same, a piston connected with each of said pedals, a cylinder surrounding each of said pistons, means for supplying air under pressure to said cylinders, and manually controlled means for turning on the air to said pistons, said manually controlled means including springs for actuating the manually controlled means when said manually controlled means have been released.

2. In an automatic control for automobiles, a piston rod connected with the clutch lever, a piston rod connected with the brake lever, a piston for each of said piston rods, a cylinder surrounding each of said pistons, a spring arranged in each of said cylinders normally holding said pistons in a retracted position whereby said levers will be held in such a position as to have the brakes disconnected and the clutch applied, means for supplying air to each of said pistons, a valve for each of said pistons for controlling said air supply to the cylinders, a manually operated lever structure arranged adjacent the steering wheel of the automobile, spring means for moving said lever structure in one direction, and means for connecting said lever structure and said valves whereby whenever said lever structures are operated by said springs said valves will be turned for admitting air under pressure into said cylinders.

3. In a device of the character described, the combination with an automobile, of a pair of air brake cylinders connected with the clutch and with the brake of the automobile, of a valve for each of said cylinders, means for supplying air to said cylinders through said valves, a system of operating members connected with each of said valves for rotating the valves in one direction, retractile means for moving the valves in the opposite direction, a pivotally mounted lever connected with each of said systems of operating members, and a spring for each of said levers for holding the same in a predetermined position, whereby said valves will be open, said levers adapted to be normally held manually in such a position as to hold said valves closed.

4. In a device of the character described, a pair of arc-shaped members adapted to be arranged adjacent the steering wheel of an automobile, an arm rigidly secured to each of said arc-shaped members, means for pivotally mounting said arm, a rod pivotally connected with each of said arms and designed to be reciprocated thereby, a spring acting on said arms for normally holding said arc-shaped members away from said steering wheel, an air brake mechanism connected with the brake of the automobile, a similar mechanism connected with the clutch of the automobile, and means connected to said air brake mechanisms, and to said reciprocating rods for transmitting motion from the reciprocating rods to the air brake mechanisms, whereby whenever said springs acting on said levers are permitted to actuate said levers said air brake mechanisms will be actuated, said arc-shaped members being designed to be manually held in engagement with said steering wheel against the action of said springs, whereby the air brake mechanisms are held out of operation.

5. In a device of the character described, a pneumatically actuated mechanism for disconnecting the clutch of an automobile, means for supplying air to said pneumatic means, a valve for regulating the amount of air supply to said pneumatic means, a connecting rod or cable connected with said valve, movable means for actuating said rod or cable, a manually operated member for holding said movable means in a predetermined position, and a spring for moving said means so that said valve will be opened, said spring actuating said movable means when said manually controlled member has been released.

6. In a device of the character described, a pair of cylinders, a piston and piston rod operatively associated with said cylinders, means for connecting one of said piston rods with the clutch of an automobile, means for connecting the other of said piston rods with the brake of an automobile, a spring arranged in each of said cylinders for normally holding the pistons in a certain position whereby the clutch will be in an inoperative position and the brakes will be released, a valve for each of said cylinders, means for supplying air under pressure to said valves, means for operating the valve of each cylinder, a piston connected with the clutch whereby the clutch may be thrown out by letting air into the cylinder by moving the piston against one of said springs, and means for simultaneously operating both of said valves for simultaneously disconnecting said clutch and applying the brakes of the automobile.

In testimony whereof I have signed my name to this specification in the presence of two subscribing witnesses.

JOSEPH J. CURRY.

Witnesses:
A. L. KITCHIN,
PHILIP D. ROLLHAUS.